United States Patent
Miller et al.

(10) Patent No.: US 9,667,576 B2
(45) Date of Patent: May 30, 2017

(54) SYSTEMS AND METHODS FOR SAFE COMMUNICATION

(71) Applicants: Ross Miller, Hilliard, OH (US); Steven Feit, Dublin, OH (US); Matt Conway, Seattle, WA (US); Michael Smith, Seattle, WA (US); Churu Yun, Seatle, WA (US); Matt Brown, Seattle, WA (US)

(72) Inventors: Ross Miller, Hilliard, OH (US); Steven Feit, Dublin, OH (US); Matt Conway, Seattle, WA (US); Michael Smith, Seattle, WA (US); Churu Yun, Seatle, WA (US); Matt Brown, Seattle, WA (US)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 14/573,027

(22) Filed: Dec. 17, 2014

(65) Prior Publication Data

US 2016/0065516 A1    Mar. 3, 2016

Related U.S. Application Data

(60) Provisional application No. 62/042,055, filed on Aug. 26, 2014.

(51) Int. Cl.
*H04M 3/42*     (2006.01)
*H04L 12/58*    (2006.01)
*H04W 4/12*     (2009.01)

(52) U.S. Cl.
CPC ............ *H04L 51/12* (2013.01); *H04L 51/20* (2013.01); *H04W 4/12* (2013.01)

(58) Field of Classification Search
CPC .......... H04M 1/72552; H04M 1/6075; H04M 1/663; H04M 1/64; H04M 1/72577; H04M 1/271; H04M 2250/02; H04M 2250/74; H04M 1/57; H04M 1/7253; H04M 1/72569; H04M 1/72572; H04W 4/12; H04W 4/046
USPC ..................................................... 455/414.2
See application file for complete search history.

(56) References Cited

U.S. PATENT DOCUMENTS

| | | | |
|---|---|---|---|
| 6,356,812 B1 | 3/2002 | Cragun | |
| 7,365,651 B2 | 4/2008 | Massey et al. | |
| 7,856,203 B2 | 12/2010 | Lipovski | |
| 8,249,627 B2 | 8/2012 | Olincy et al. | |
| 8,315,597 B2 | 11/2012 | Olincy et al. | |
| 8,395,522 B2 | 3/2013 | Kweon | |
| 8,401,578 B2 | 3/2013 | Inselberg | |
| 8,559,932 B2 | 10/2013 | Elliott et al. | |

(Continued)

*Primary Examiner* — Kwasi Karikari
(74) *Attorney, Agent, or Firm* — Armstrong Teasdale LLP

(57) ABSTRACT

A method and system for use in managing communication messages are provided. The system includes a display unit and one or more processors communicatively coupled to one or more memory devices and the display unit. The one or more processors are programmed to receive an incoming message for a driver of the vehicle, determine if the driver is experiencing a high-intensity situation, automatically respond to the incoming message with a reply message to the sender of the incoming message if the driver is experiencing the high-intensity situation, and automatically notify the driver, after the high-intensity situation has ended, that the incoming message was received.

20 Claims, 3 Drawing Sheets

(56) References Cited

U.S. PATENT DOCUMENTS

| | | |
|---|---|---|
| 2009/0149168 A1 | 6/2009 | McLean |
| 2009/0298482 A1* | 12/2009 | Yen ..................... H04M 1/6075 |
| | | 455/414.2 |
| 2010/0184406 A1 | 7/2010 | Schrader |
| 2011/0076996 A1 | 3/2011 | Burton et al. |
| 2011/0219080 A1 | 9/2011 | McWithey et al. |
| 2012/0050028 A1 | 3/2012 | Mastronardi et al. |
| 2012/0064865 A1 | 3/2012 | Choi et al. |
| 2012/0176232 A1 | 7/2012 | Bantz et al. |
| 2012/0326855 A1 | 12/2012 | Bantz et al. |
| 2013/0021176 A1* | 1/2013 | Tu ......................... H04W 4/027 |
| | | 340/994 |
| 2013/0137404 A1* | 5/2013 | Kuo ..................... H04W 4/046 |
| | | 455/413 |
| 2013/0141226 A1 | 6/2013 | Agnew |
| 2013/0165165 A1 | 6/2013 | Macek et al. |
| 2013/0172027 A1 | 7/2013 | Sturges et al. |
| 2013/0275875 A1 | 10/2013 | Gruber et al. |
| 2013/0275899 A1 | 10/2013 | Schubert et al. |
| 2013/0281023 A1 | 10/2013 | Madanarajagopal et al. |
| 2013/0295910 A1 | 11/2013 | Enty et al. |
| 2013/0303143 A1* | 11/2013 | Schrader ............. H04W 12/08 |
| | | 455/418 |
| 2014/0007010 A1 | 1/2014 | Blom |
| 2014/0057610 A1* | 2/2014 | Olincy ............. H04M 3/42365 |
| | | 455/414.1 |
| 2014/0323111 A1* | 10/2014 | Ning ................ H04M 1/72577 |
| | | 455/418 |

\* cited by examiner

SYSTEMS AND METHODS FOR SAFE COMMUNICATION

CROSS REFERENCE TO RELATED APPLICATIONS

This application claims priority to and the benefit of the filing date of U.S. Provisional Application No. 62/042,055 filed on Aug. 26, 2014, which is hereby incorporated by reference in its entirety.

BACKGROUND

This disclosure relates generally to mobile communication systems and, more particularly, to systems and computer-implemented methods for determining when received messages will be displayed to a recipient.

At least some known vehicles include an onboard communication system device that is configured to communicate incoming message information to a driver of the vehicle. However, it is known that certain situations require greater driver attention to the driving environment than others. For example, high-intensity traffic situations, such as, but not limited to negotiating turns and/or curves in the road are situations that require greater driver attention. Unfortunately, during such driving situations it is known that the driver may receive an indication of the arrival of an external communication. Usually, the arrival is annunciated by the communication system both audibly and visually. The driver could attempt to ignore the annunciation to avoid the distraction of handling the incoming message, however, the purpose of the annunciation is to attract the driver's attention. It would be difficult for the driver to ignore the annunciation. Some known systems permit a communication system to receive audio commands, which the driver could use to silence the audio portion of the annunciation. This also requires a distracting interaction with the communication system.

BRIEF DESCRIPTION

In one aspect, a system for use in managing communication messages includes a display unit and one or more processors communicatively coupled to one or more memory devices and the display unit. The one or more processors are programmed to receive an incoming message for a driver of the vehicle, determine if the driver is experiencing a high-intensity situation, automatically respond to the incoming message with a reply message to the sender of the incoming message if the driver is experiencing the high-intensity situation, and automatically notify the driver, after the high-intensity situation has ended, that the incoming message was received.

In another aspect, a computer-based method for managing communication information in a vehicle wherein the method is implemented using a computer device coupled to a memory device. The method includes receiving an incoming message for a driver of the vehicle, determining if the driver is experiencing a high-intensity situation, automatically responding to the incoming message with a reply message to the sender of the incoming message if the driver is experiencing a high-intensity situation, automatically notifying the driver that an incoming message was received if the driver is not experiencing a high-intensity situation, and automatically notifying the driver, after the high-intensity situation has ended, that the incoming message was received.

In still another aspect, a computer-readable storage device having processor-executable instructions embodied thereon is provided. The processor-executable instructions are for managing automotive communication information using a display unit communicatively coupled to a computing device including one or more processors. When executed by the computing device, the processor-executable instructions cause the computing device to receive an incoming message addressed to the operator, determine if the operator is experiencing a high-intensity situation, and automatically respond to the incoming message with a reply message to the sender of the incoming message if the operator is experiencing the high-intensity situation. The processor-executable instructions further cause the computing device to automatically notify the operator that an incoming message was received if the operator is not experiencing the high-intensity situation, and automatically notify the operator, after the high-intensity situation has ended, that the incoming message was received.

In yet another aspect, an automotive communication information display system includes a display unit accessible to an operator of an automotive vehicle and one or more processors communicatively coupled to one or more memory devices and the display unit. The one or more processors are programmed to receive an incoming message addressed to the operator, determine if the operator is experiencing a high-intensity situation, and automatically respond to the incoming message with a reply message to the sender of the incoming message if the operator is experiencing the high-intensity situation. The one or more processors are further programmed to automatically notify the operator that an incoming message was received if the operator is not experiencing the high-intensity situation and automatically notify the operator, after the high-intensity situation has ended, that the incoming message was received.

DETAILED DESCRIPTION

Implementations of methods and systems described herein facilitate managing communications while a recipient of a text message is operating a vehicle. A vehicle may include a communications management system configured to receive incoming phone calls, SIMS messages, or other types of electronic communications directly or through a mobile communication device associated with a recipient, who is typically the driver of the vehicle. When the communications management system and mobile communication device are paired, either may be capable of performing the actions described herein either alone or in combination with the other of the communications management system or mobile communication device. For example, in one embodiment, after a text message is received by the recipient's mobile communication device, such as, but, not limited to, a cell phone or smart phone, the system or, in some embodiments, the recipient's cell phone, determines whether the recipient is experiencing a high-intensity situation. If the system or cell phone determines that the recipient is experiencing a high-intensity situation, the system or cell phone automatically responds to the text message with a reply message. After the system or cell phone determines that the recipient is no longer experiencing the high-intensity situation, the system or cell phone presents the recipient with a notification that the text message was received. The notification may include a name of the sender of the text message. If, on the other hand, the system or cell phone determines that the recipient is not experiencing a high-intensity situation, the system or cell phone presents the recipient with a notification that the text message was received. The notification may include a name of the sender of the text message.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
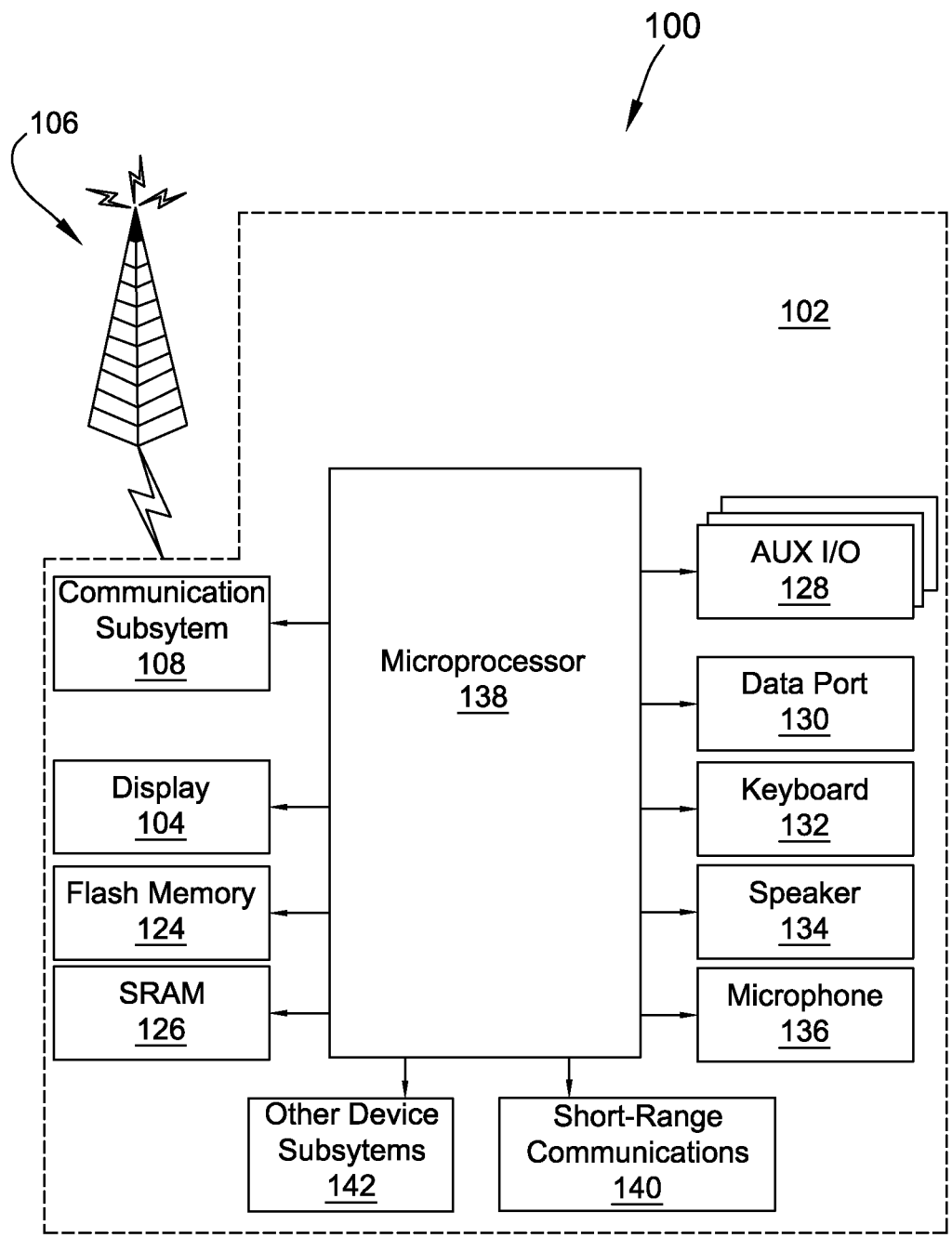
FIG. 1 is a schematic block diagram of a computer system, namely a mobile communication device in accordance with an example embodiment of the present disclosure.

FIG. 1 is a schematic block diagram of a vehicle computer system 100 including a communications management system 102 configured to facilitate safe communications during certain driving situations where a driver's attention to the driving situation is better left uninterrupted by incoming communications.

In various embodiments, system 102 includes a two-way communication device having at least voice and advanced data communication capabilities, including the capability to communicate with other computer systems. Typically, system 102 is a mounted component in a vehicle that is configured to open channels of communication with various devices using protocols respective of each particular device. For example, system 102 may communicate with cell phone towers using a first protocol and near-field devices using a second protocol and so on. Depending on the functionality provided by system 102, it may be referred to as a mobile communication device, a data messaging device, a two-way pager, a cellular telephone with data messaging capabilities, a wireless Internet appliance, or a data communication device (with or without telephony capabilities). System 102 may communicate with any one of a plurality of fixed transceiver stations 106 (only one is shown) within its geographic coverage area.

In some embodiments, system 102 includes a communication subsystem 108, which includes a receiver, a transmitter, and associated components, such as one or more (preferably embedded or internal) antenna elements and, local oscillators (LOs), and a processing module such as a digital signal processor (DSP) (all not shown). A particular design of communication subsystem 108 depends on the communication network in which system 102 is intended to operate.

System 102 includes one or more processors 138 that control an overall operation of system 102. Communication functions, including at least data and voice communications, are performed through communication subsystem 108. One or more processors 138 also interact with additional device subsystems such as visual display screen 104, memory devices 123, for example, a flash memory 124 or other persistent store, a random access memory (RAM) 126, auxiliary input/output (I/O) subsystems 128, a serial port 130, a keyboard 132, a speaker 134, a microphone 136, a short-range communications subsystem 140, and any other device subsystems generally designated at 142. Some of the subsystems shown in FIG. 1 perform communication-related functions, whereas other subsystems may provide "resident" or on-device functions. Notably, some subsystems, such as keyboard 132 and visual display screen 104, for example, may be used for both communication-related functions, such as entering a text message for transmission over a communication network, and device-resident functions such as the entertainment system. Operating system software used by one or more processors 138 is preferably stored in a persistent store such as flash memory 124, which may alternatively be a read-only memory (ROM) or similar storage element (not shown). The operating system, specific device applications, or parts thereof, may be temporarily loaded into a volatile store such as RAM 126.

One or more processors 138, in addition to their operating system functions, facilitate execution of software applications on system 102. A predetermined set of applications that control basic device operations, including at least data and voice communication applications and entertainment system functions is installed on system 102.

Additional applications may also be loaded onto system 102 through network (106), an auxiliary I/O subsystem 128, serial port 130, short-range communications subsystem 140, or any other suitable subsystem 142, and installed by a user in RAM 126 or preferably a non-volatile store (not shown) for execution by one or more processors 138. Such flexibility in application installation increases the functionality of system 102 and may provide enhanced on-device functions, communication-related functions, or both.

In a data communication mode, a received signal such as a text message, an e-mail message, or web page download will be processed by communication subsystem 108 and input to one or more processors 138. One or more processors 138 will preferably further process the signal for output to visual display screen 104 and/or to auxiliary I/O device 128. A user of system 102 may also compose data items, such as e-mail messages, for example, using keyboard 132 in conjunction with visual display screen 104, microphone 136, and auxiliary I/O device 128. These composed items may be transmitted over a communication network through communication subsystem 108 or short-range communication subsystem 140. In the present embodiment, visual display screen 104 includes a color display device that is capable of displaying a plurality of colors.

For voice communications, the overall operation of system 102 is substantially similar, except that the received signals would be output to speaker 134 and signals for transmission would be generated by microphone 136. Alternative voice or audio I/O subsystems, such as a voice message recording subsystem, may also be implemented on system 102. Although voice or audio signal output is preferably accomplished primarily through speaker 134, visual display screen 104 may also be used to provide an indication of the identity of a calling party, duration of a voice call, or other voice call related information, as some examples.

Data port 130 can be serial or USB. Data port 130 extends the capabilities of system 102 by providing for information or software downloads to system 102 other than through a wireless communication network. For example, MP3 or other format media files may be stored on a thumb drive and connected to data port 130 for playback through system 102.

A short-range communications subsystem 140 provides for communication between system 102 and different systems or devices, which need not necessarily be similar devices. For example, subsystem 140 may include an infrared device and associated circuits and components, or a Bluetooth™ communication module to provide for communication with similarly enabled systems and devices. Bluetooth is a registered trademark of Bluetooth SIG, Inc. A Wi-Fi™ communication subsystem may also be employed.

Figure 2:
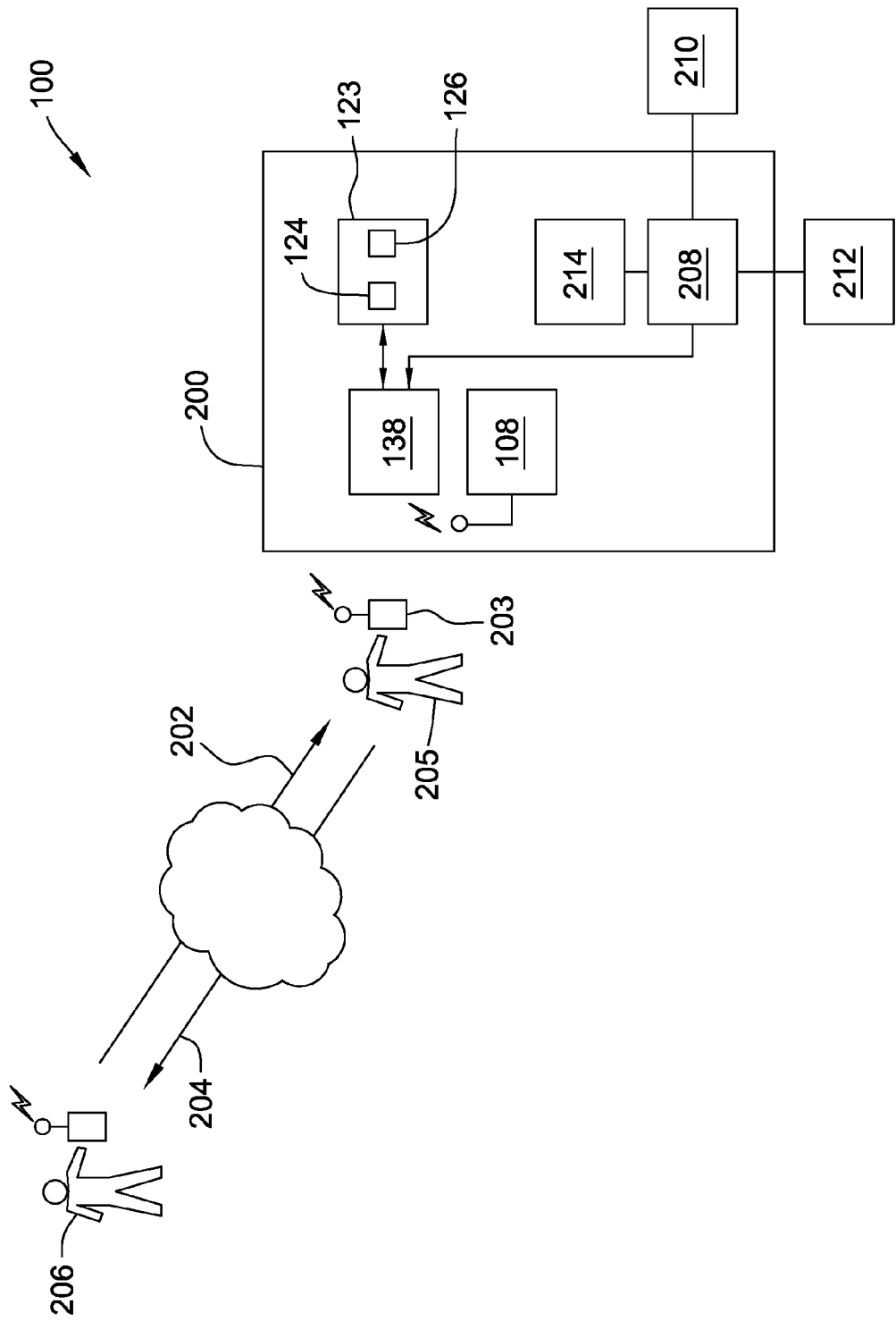
FIG. 2 is a schematic block diagram of an automotive communication information management subsystem of the computer system shown in FIG. 1.

FIG. 2 is a schematic block diagram of an automotive communication information management subsystem 200 of computer system 100 (shown in FIG. 1). In the example embodiment, automotive communication information management subsystem 200 includes one or more processors 138 and visual display screen 104. Other components communicatively coupled to one or more processors 138 may also be considered a part of automotive communication information management subsystem 200. Visual display screen 104 is accessible to an operator (not shown) of an automotive vehicle (not shown), such as a driver of the vehicle. One or more processors 138 are communicatively coupled to one or more memory devices 123.

In various embodiments, one or more processors 138 may be programmed to determine if the operator is operating the vehicle while the vehicle is in a high intensity situation. As used herein, a high-intensity situation refers to situations where the need for the driver's attention to be focused on controlling the vehicle is heightened by, for example, adverse road conditions, increased traffic flow, intersections, changing lanes, merging into traffic from highway on/off ramps or interchanges, driving through a school zone or construction zone, turning, executing a navigation maneuver, velocity over a certain threshold, acceleration or g-forces over a certain threshold, deceleration or braking over a certain threshold, having an object in a blind spot, potential obstacles in or near the roadway, changing paths of the road, for example, at or approaching a curve or a turn, and/or combinations of the above. For example, one or more processors 138 may be programmed to determine whether the vehicle is on a curved segment of a road and/or is approaching a curved segment of the road. In some embodiments, one or more processors 138 are programmed to receive an indication of forces acting on the vehicle from a high-intensity module 208, for example, an accelerometer 210. In other embodiments one or more processors 138 are programmed to receive a geoposition of the vehicle from, for example a global positioning system (GPS) device 212, to receive geodata 214 of an area surrounding the geoposition, and to determine a position of the vehicle with respect to the segment of the road using the geoposition and geodata 214. In other embodiments, determining if the operator is experiencing a high-intensity situation may also include sensors that monitor the exterior of the vehicle, for example, an area in forward view of the vehicle. These sensors can include cameras, ultrasonic sensors and radar sensors. These sensors can sense whether or not objects are in the path of the vehicle or whether or not the vehicle is in an area with increased traffic flow. In various other embodiments, determining if the operator is experiencing a high-intensity situation may also include sensors that monitor driver biometrics directly and/or monitor environmental parameters that may indirectly affect the biometrics of the driver. These sensors may include cameras, heart rate sensors, or other biological sensors. For example, eye movement, heart rate, steering wheel grip and grip placement, seat back pressure may indicate stress in the driver that is indicative of the high-intensity situation.

One or more processors 138 are programmed to receive an incoming message 202, determine if recipient 205 is experiencing a high-intensity situation, and automatically respond to the text message with a reply message 204 to a sender 206 of incoming message 202 if recipient 205 is experiencing the high-intensity situation. In various embodiments, one or more processors 138 are programmed to respond to incoming message 202 with a pre-composed reply message or a reply message that includes information relating to the high-intensity situation. In some embodiments, one or more processors 138 are programmed to respond to the incoming message with a reply message recorded by recipient 205 after receiving the incoming message. Incoming message 202 may be received after being relayed through a mobile communication device 203 of a recipient 205 operating the vehicle or received directly from sender 206. Incoming message 202 may also be received from sender 206 through a communications network 207, such as, but not limited to, a cell tower network or the Internet. Incoming message 202 further may be received from sender 206 through a near-field communication system, or combinations of the above. For example, incoming message 202 may be received by mobile communication device 203, embodied in a smart phone or cell phone carried by recipient 205. Mobile communication device 203 may then process the message or may transmit incoming message 202 to communication subsystem 108, if paired with mobile communication device 203, for processing.

One or more processors 138 are also programmed to automatically notify recipient 205 that an incoming message was received if recipient 205 is not experiencing the high-intensity situation. The automatic notification happens without intentional delay by system 100 when the driver is not experiencing a high-intensity situation. System 100 is configured to facilitate passing incoming message 202 through mobile communication device 203 the driver. One or more processors 138 are further programmed to automatically notify recipient 205, after the high-intensity situation has ended, that a message was received. In various embodiments, incoming message 202 is held in a queue during the high-intensity situation and no notification of the receipt of incoming message 202 is made to the driver during the high-intensity situation. After one or more processors 138 determine that the high-intensity situation has ended all incoming messages 202 that were received during the high-intensity situation are indicated to the driver by a notification on visual display screen 104 and/or an annunciation through speaker 134.

Figure 3:
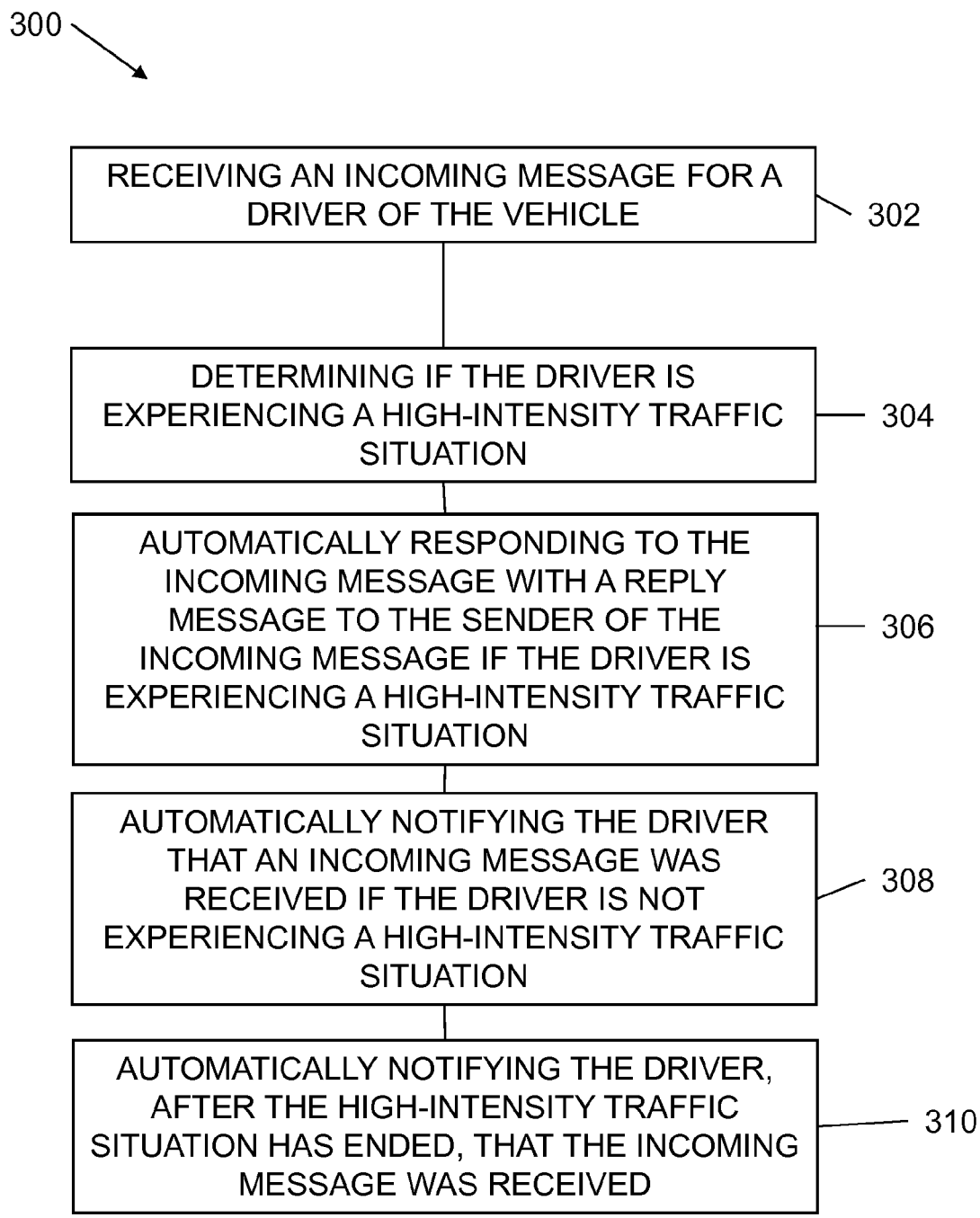
FIG. 3 is a flow chart of a method 300 of managing communication information in a vehicle in accordance with an example embodiment of the present disclosure.

FIG. 3 is a flow chart of a method 300 of managing communication information in a vehicle. The method is implemented using a computer device coupled to a memory device. In the exemplary embodiment, method 300 includes receiving 302 an incoming message for a driver of the vehicle, determining 304 if the driver is experiencing a high-intensity situation, and automatically responding 306 to the incoming message with a reply message to the sender of the incoming message if the driver is experiencing a high-intensity situation. Method 300 also includes automatically notifying 308 the driver that an incoming message was received if the driver is not experiencing a high-intensity situation and automatically notifying 310 the driver, after the high-intensity situation has ended, that the incoming message was received.

The methods and systems described herein may be implemented using computer programming or engineering techniques including computer software, firmware, hardware or any combination or subset thereof, wherein the technical effect may include at least one of: (a) receiving an incoming message for a driver of the vehicle, (b) determining if the driver is experiencing a high-intensity situation, (c) automatically responding to the incoming message with a reply message to the sender of the incoming message if the driver is experiencing a high-intensity situation, (d) automatically notifying the driver that an incoming message was received if the driver is not experiencing a high-intensity situation, and automatically notifying the driver, after the high-intensity situation has ended, that the incoming message was received.

The term processor, as used herein, refers to central processing units, processors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by one or more processors 138, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The systems and methods described herein receive a communication and determine whether the driver is experiencing a high-intensity situation before alerting the driver to the receipt of the external communication. If the driver is experiencing a high-intensity driving situation when the external communication is received, the system responds to the sender with a predetermined message to the sender. The response alerts the sender to the driver's reason for not responding if the sender was expecting an immediate reply. The response may also indicate to the sender that the message was successfully received and will be presented to the driver at the end of the high-intensity driving situation. Accordingly, the systems and methods described herein may facilitate a safer driving environment.

Exemplary embodiments of systems and methods for delaying presentation of incoming messages to a driver during periods of high-intensity situations are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in managing text messages, said system comprising:
    a display unit; and
    one or more processors communicatively coupled to one or more memory devices, said one or more processors communicatively coupled to said display unit, said one or more processors programmed to:
        receive an incoming text message for a driver of a vehicle;
        receive biometric sensor information about the driver of the vehicle;
        determine if the driver is experiencing a high-intensity situation based in part on the biometric sensor information and if the driver is operating the vehicle in a curved segment of a road;
        automatically respond to the incoming text message with a reply text message to a sender of the incoming text message if the driver is experiencing the high-intensity situation; and
        automatically notify the driver, after the high-intensity situation has ended, that the incoming text message was received.

2. The system of claim 1, wherein said one or more processors are programmed to automatically notify the driver without intentional delay that an incoming text message was received if the driver is not experiencing the high-intensity situation.

3. The system of claim 1, wherein said one or more processors are programmed to receive an incoming text message for a driver of the vehicle from a mobile communication device associated with the driver.

4. The system of claim 1, wherein said one or more processors are programmed to receive an indication of forces acting on the vehicle from an accelerometer.

5. The system of claim 1, wherein said one or more processors are programmed to respond to the incoming text message with a text reply message that includes information relating to the high-intensity situation.

6. The system of claim 1, wherein said one or more processors are programmed to respond to the incoming text message with a reply text message recorded by the driver after receiving the incoming text message.

7. The system of claim 1, wherein the biometric information includes at least one of eye movement, heart rate, and seat back pressure.

8. A computer-based method for managing communication information in a vehicle, said method implemented using a computer device coupled to a memory device, said method comprising:
- receiving, by the computing device, an incoming text message for a driver of the vehicle;
- receiving biometric sensor information about the driver of the vehicle;
- determining, by the computing device, if the driver is experiencing a high-intensity situation based in part on the biometric sensor information and if the driver is operating the vehicle in a curved segment of a road;
- automatically responding to the incoming text message with a reply text message to a sender of the incoming text message if the driver is experiencing a high-intensity situation;
- automatically notifying the driver that an incoming text message was received if the driver is not experiencing a high-intensity situation; and
- automatically notifying the driver, after the high-intensity situation has ended, that the incoming text message was received.

9. The method of claim 8, wherein determining, by the computing device, if the driver is experiencing a high-intensity situation comprises receiving a selection of a threshold level of the high-intensity situation.

10. The method of claim 8, wherein receiving, by the computing device, an incoming text message for a driver of the vehicle comprises receiving an incoming text message for a driver of the vehicle from the sender and relayed through a mobile communication device associated with the driver.

11. The method of claim 8, wherein determining if the driver is operating the vehicle while the vehicle is in a curved segment of a road comprises: receiving a geoposition of the vehicle; receiving geodata of an area surrounding the geoposition; determining a position of the vehicle with respect to the curved segment of the road.

12. The method of claim 8, wherein automatically responding to the incoming text message comprises responding to the incoming text message with a pre-composed reply text message.

13. The method of claim 8, wherein the biometric information includes at least one of eye movement, heart rate, and seat back pressure.

14. An automotive communication information management system comprising:
- a display unit accessible to an operator of an automotive vehicle; and
- one or more processors communicatively coupled to one or more memory devices, said one or more processors communicatively coupled to said display unit, said one or more processors programmed to:
- receive an incoming text message addressed to the operator;
- receive biometric sensor information about the driver of the vehicle;
- determine if the operator is experiencing a high-intensity situation based in part on the biometric sensor information and if the operator is operating the vehicle in a curved segment of a road;
- automatically respond to the incoming text message with a reply text message to a sender of the incoming text message if the operator is experiencing the high-intensity situation;
- automatically notify the operator that an incoming text message was received if the operator is not experiencing the high-intensity situation; and
- automatically notify the operator, after the high-intensity situation has ended, that the incoming text message was received.

15. The system of claim 14, wherein said one or more processors are programmed to receive an incoming text message from a mobile communication device associated with the operator.

16. The system of claim 14, wherein said one or more processors are programmed to receive an indication of forces acting on the vehicle from an accelerometer.

17. The system of claim 14, wherein said one or more processors are programmed to respond to the incoming text message with a pre-composed reply text message.

18. The system of claim 14, wherein said one or more processors are programmed to respond to the incoming text message with a reply text message that includes information relating to the high-intensity situation.

19. The system of claim 14, wherein said one or more processors are programmed to respond to the incoming text message with a reply text message recorded by the operator after receiving the incoming text message.

20. The system of claim 14, wherein the biometric information includes at least one of eye movement, heart rate, and seat back pressure.

* * * * *